United States Patent [19]
Araki et al.

[11] Patent Number: 5,355,634
[45] Date of Patent: Oct. 18, 1994

[54] TOOL HOLDER UNIT FOR A ROBOT

[75] Inventors: Hisashi Araki; Shinobu Kawase, both of Shizuoka, Japan

[73] Assignee: Yamaha Corporation, Japan

[21] Appl. No.: 888,181

[22] Filed: May 26, 1992

[30] Foreign Application Priority Data

May 24, 1991 [JP] Japan .................................. 3-149690
May 24, 1991 [JP] Japan .................................. 3-149691

[51] Int. Cl.⁵ ........................ B25J 17/02; B24B 41/00
[52] U.S. Cl. ..................................... 451/490; 451/24
[58] Field of Search ............. 51/166 r, 166 TS, 165.9, 51/165.71, 595 S

[56] References Cited
FOREIGN PATENT DOCUMENTS 63-201087 12/1963 Japan .
60-127992 7/1985 Japan .
60-217088 10/1985 Japan .
61-214991 9/1986 Japan .

Primary Examiner—Roscoe V. Parker
Attorney, Agent, or Firm—Ostrolenk, Faber, Gerb & Soffen

[57] ABSTRACT

A tool holder unit for a robot includes a pantograph linkage which is made up of a frame, a pair of parallel spaced links and a holder block. Each end of the parallel spaced links is connected to the holder block. The tool holder also includes a drive source which drives a tool and an offsetting member which offsets the gravitational force caused by the force of gravity on the tool. The tool moves relative to a workpiece when a force from the drive source moves the pantograph linkage. The pantograph linkage and offsetting member reduce the load on the drive source and move the tool quickly and smoothly.

11 Claims, 3 Drawing Sheets

TOOL HOLDER UNIT FOR A ROBOT

BACKGROUND OF THE INVENTION

The present invention relates to a tool holder unit for a robot, and more particularly relates to an apparatus for easily and accurately moving a tool held by a robot relative to a workpiece.

One conventional example of such a tool holder unit is disclosed in Japanese Utility Model Laid-open Hei. 2-107416. This tool holder unit includes a device for removing burrs from a workpiece. More specifically, a presser unit holding a tool is supported in a main body of the device and is provided with two sets of drive sources, i.e. hydraulic cylinders. One hydraulic cylinder is operationally connected to the presser unit in the axial direction of the presser unit. The other hydraulic cylinder is operationally connected to the presser unit in a direction normal to the axial direction of the presser unit. The first hydraulic cylinder forces the tool held by the presser unit to advance toward a work, whereas the second hydraulic cylinder forces the tool to recede from the work.

In the case of this prior art device, however, smooth movement of the presser unit is greatly hindered by various factors. First, points of force transmission by the two hydraulic cylinders are separated from each other in a direction normal to the axial direction, i.e. the sliding direction of the presser unit. This arrangement tends to generate a bending moment to twist the presser unit in an axial direction of the presser unit, thereby hindering smooth sliding of the presser unit in the axial direction.

In addition, during operation on the workpiece, reaction force from the workpiece also generates a like bending moment which twists the presser unit around its axial direction, thereby again hindering smooth sliding of the presser unit in its axial direction. Further, sliding resistance by the two hydraulic cylinders also hinders on the sliding movement of the presser unit.

SUMMARY OF THE INVENTION

It is an object of the present invention to provide an apparatus for producing smooth movement of a tool held by a robot relative to a workpiece.

In accordance with one aspect of the present invention, a force for causing movement of a tool with respect to a workpiece transmitted from a drive source to the tool via a pantograph linkage and a offsetting means.

In accordance with another aspect of the present invention, a tool is directly held by a robot and means for offsetting the weight of the tool is connected to the tool.

DESCRIPTION OF THE PREFERRED EMBODIMENTS

Figure 1:
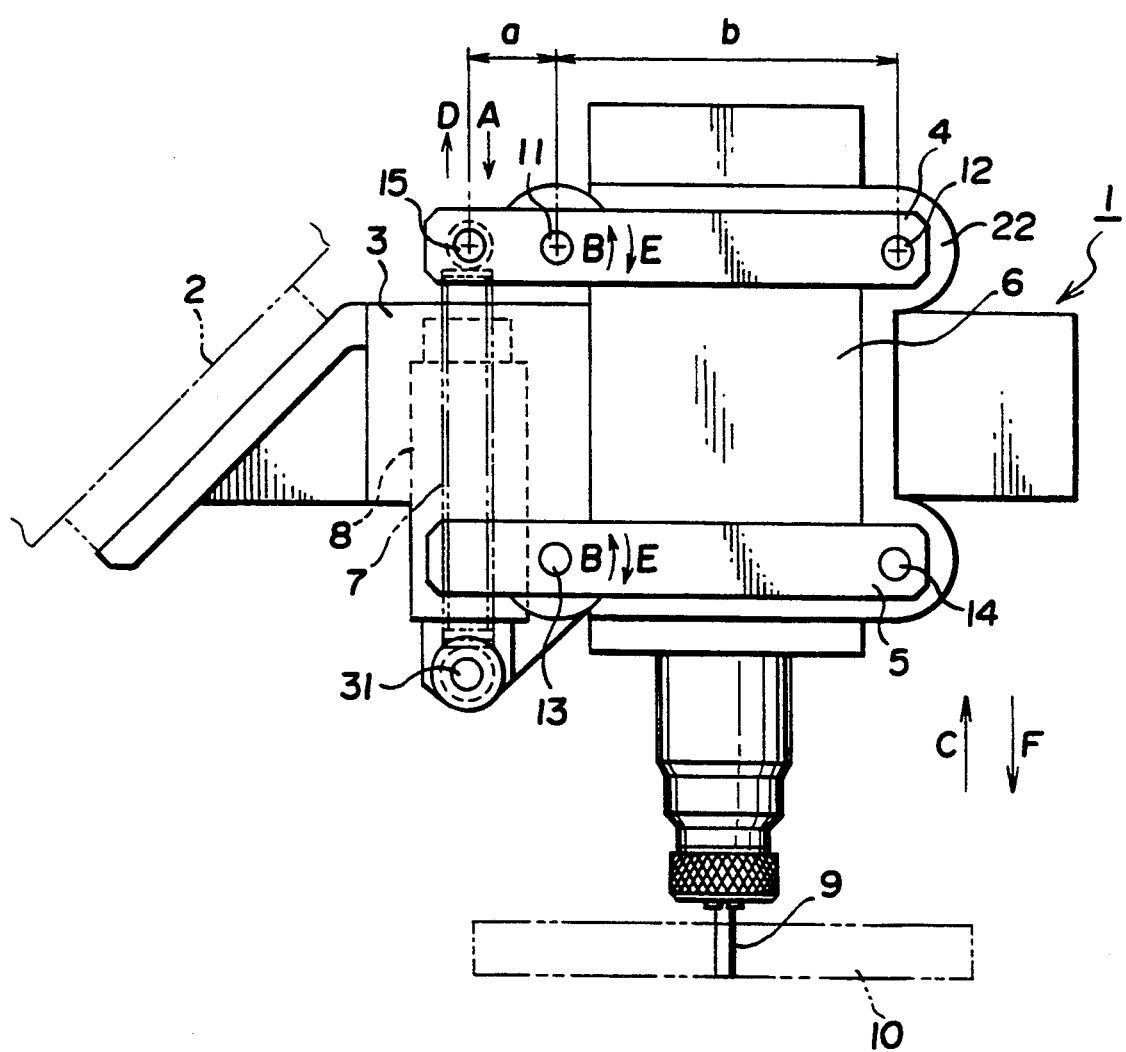
FIG. 1 is a side view of one embodiment of the tool holder unit in accordance with the present invention.

One embodiment of the tool holder unit in accordance with the present invention is shown in FIG. 1, in which the operation of the holder unit 1 is based on, as stated above, use of a pantograph linkage. This pantograph linkage is made up of four elements connected to each other at their longitudinal ends. More specifically, the pantograph linkage is made up of a frame 3 secured to the hand of a robot 2, a pair of links 4 and 5 pivoted to the frame 3 and a holder block 22 connected to the links 4 and 5. The holder block 22 holds a tool 6 in the form of a sander in this example. The tool 6 is provided with a sander plate 10 connected thereto via a rotary shaft 9.

The first link 4 is rotatably mounted to the upper section of the frame 3 at the first pivot 11. The first link 4 is connected at one end to the upper section of the holder block 22 at the first joint 12. Likewise, the second link 5 is rotatably mounted to the lower section of the frame 3 at the second pivot 13. The second link 5 is connected at one end to the lower section of the holder block 22 at the second joint 14.

The first link 4 is provided at the other end with a pin 15 which is operationally connected to one end of a tension spring 7 which is connected at the other end to a pin 31 secured to the lower section of the frame 3. The pin 15 is also operationally connected to the piston rod of an air cylinder 8, i.e. a drive source, which is also mounted on the pin 31.

When the air-cylinder 8 is not in operation, tension by the spring 7 operates on the first link 4 in a direction A to generate a moment about the first pivot 11 acting in a direction B. Due to transmission via the holder block 22, a same moment is generated about the second pivot 13 of the second link 5 in the same direction B. Then, a force acts on the first and second joints 12, 14 in a direction C so that the same force acts on the rotary shaft 9 and the sander plate 10 in the same direction C. This force in the direction C acts to offset the weights of the tool, i.e. the sander 6 and the holder block 22.

When the air cylinder 8 is in operation, the piston rod of the air cylinder 8 advances thereby overcoming the tension provided by the spring 7. This produces a force on the first link 4 in a direction D. This force generates a moment about the first pivot 11 acting in a direction E. Due to transmission via tile holder block 22, a same moment is generated about the second pivot 13 of the second link 5 in the same direction E. Then, a force acts on the first and second joints 12, 14 in a direction F so that the same force acts on the rotary shaft 9 and the sander plate 10 in the same direction F. This force in the direction F acts to press the tool, i.e. the sander 6 against a workpiece.

When the distance between the first pivot 11 and the pin 15 is equal to "a" and the distance between the first pivot 11 and the first joint 12 is equal to "b" as shown in FIG. 2 A, a value equal to "a/b" is called a lever ratio. Then, the smaller the lever ratio, the smaller the influence of the sliding resistance in the air cylinder 8 on the tool, i.e. the sander 6. More specifically, the sliding resistance of the links 4 and 5 is assumed to be equal to L , tile sliding resistance of the air cylinder 8 is assumed to be equal to SF and the sliding resistance between the sander 6 and the holder block 22 is assumed to be equal to UF. Then the following relationship is believed to exist between these values;

$$UF = LF + (a/b) \cdot SF \qquad (1)$$

Figure 2A:
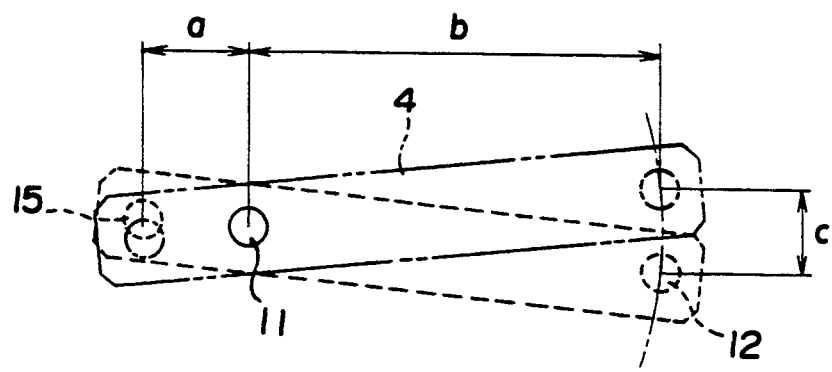
FIGS. 2A to 2C are side views for showing operation of the tool holder unit shown in FIG. 1.
Figure 2B:
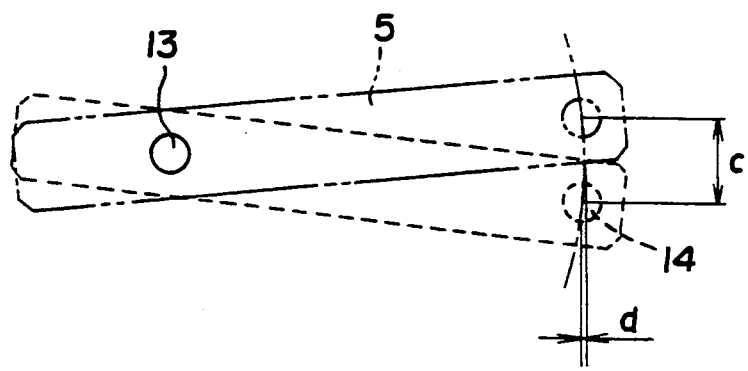
Figure 2C:
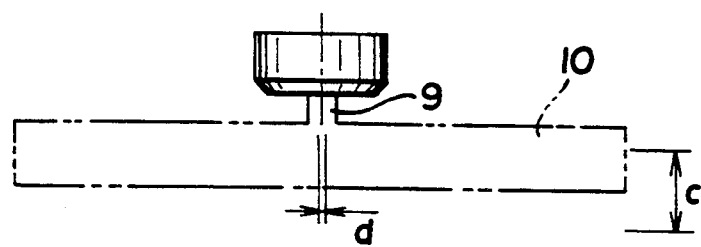

It is clear from this equation that the sliding resistance UF between the tool, i.e. the sander 6 and the holder block 22 is smaller when the value of the lever ration (a/b) is smaller. As shown in FIG. 2A, the link 4 moves from the position shown with dot lines to the position shown with chain lines in the axial direction of the rotary shaft 9 over a distance "c". Concurrently, the first joint 12 moves in a direction normal to the axial direction over a distance "d" as shown in FIGS. 2B and 2C. It is noted from the illustration that, as compared with the moving distance "c" of the first joint 12 in the axial direction, the moving distance "d" of the first joint 12 in the normal direction is extremely small. Stated otherwise, despite a relatively large moving distance "c" of the turning links 4 and 5 in the axial direction of the tool, their moving distance "d" in the normal direction is extremely small.

The reduced sliding resistance between the tool and the tool holder unit in accordance with the present invention assures very smooth movement of the tool during operation and, as a consequence, the tool holder unit in accordance with the present invention is well suited for even and smooth removal of burrs and beads from a workpiece. In practice, due to uneven dimensions of burrs and/or beads on the workpiece, some degree of play in the axial direction is needed to facilitate movement of the tool. Such play in movement is provided by precise position control of the tool in operation, in particular of the rotary shaft 9. Smooth movement of the tool is a prerequisite for such a precise position control.

Thus, the present invention satisfies the demand for precise position control of the tool.

As is clear from the foregoing equation (1), a small value of the lever ratio (a/b) minimizes influence by the sliding resistance LF in the air cylinder 8, i.e. the drive source.

In addition, holding of the tool, the sander 6, by means of a pantograph linkage assures high rigidity of the holder unit 1, thereby raising accuracy and reliability in operation and mechanical durability of the entire construction.

Further, the extremely small moving distance "d" in the normal direction enables easy and trouble-free removal of burrs and beads from a workpiece. Use of the tension spring 7 offsets the weights of the tool and the holder block 22 and, as a consequence, even a relatively small force provided by the drive source, i.e. the air cylinder 8, can sufficiently move the tool in the axial direction, thereby remarkably reducing power consumption and increasing sensitivity in movement.

Figure 3:
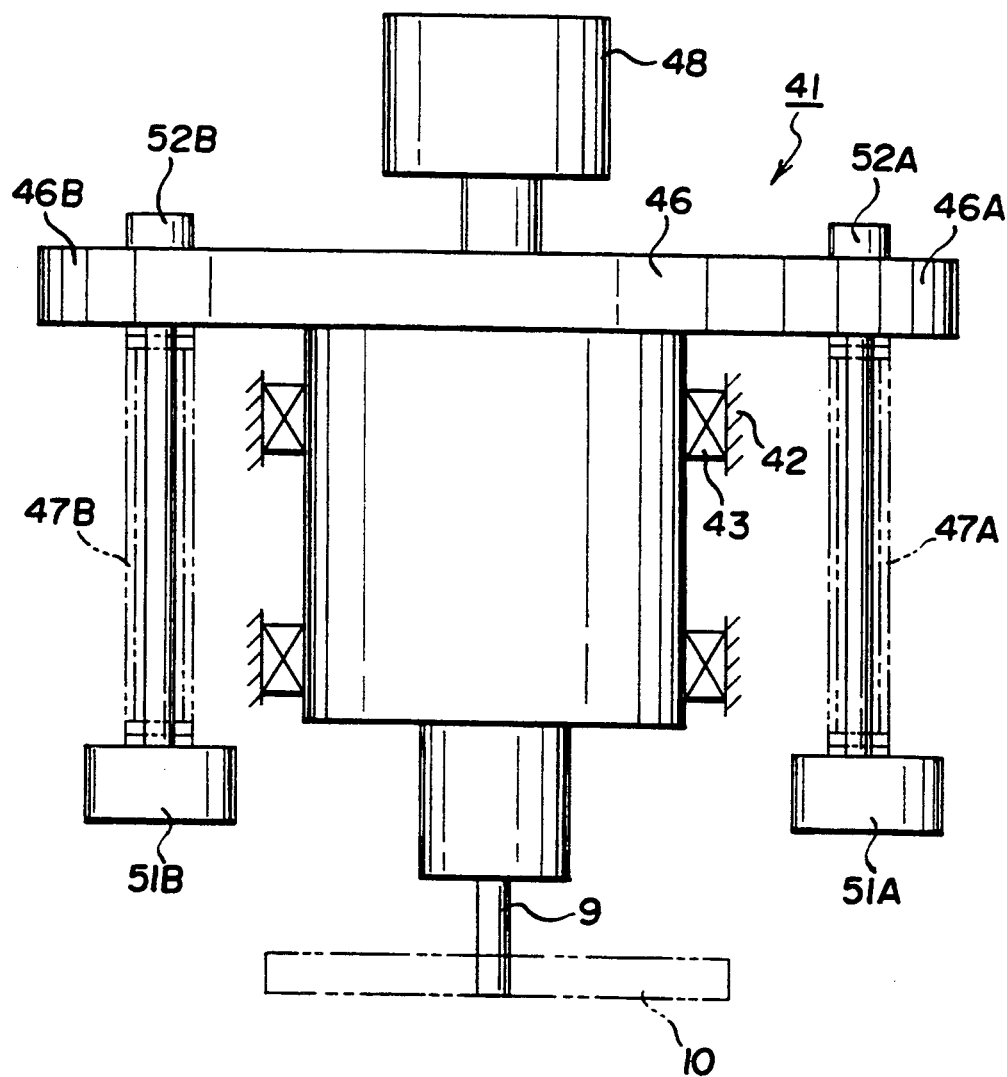
FIG. 3 is a side view of another embodiment of the tool holder in accordance with the present invention.

Another embodiment of the tool holder unit in accordance with the present invention is shown in FIG. 3 in which a tool is directly held by a robot. More specifically, the tool holder unit 41 includes a tool 46 held by a robot 42 via bearings 43. The tool 46 has lateral extensions 46A and 46B formed at its upper section. Lateral extensions 46A, 46B are interposed between frames 51A, 52A and between frames 52A, 52B, respectively. Compression springs 47A and 47B are interposed between the lateral extensions 46A and 46B and frames 51A and 51B, respectively. The tool 46 carries a sander plate 10 via a rotary shaft 9. Further, an air cylinder 48, i.e. a drive source is mounted and connected to the tool 46 itself.

When the air cylinder 48 is not in operation, repulsion by the springs 47A and 47 act on the lateral extensions 46A and 46B to offset the weight of the tool 46. When the air cylinder 48 is in operation, a force from the air cylinder 48 forces the tool 46 to move toward a workpiece not shown thereby overcoming the repulsion by force provided the springs 47A and 47B.

We claim:

1. A tool holder for holding a tool on a robot, the tool having first and second lateral extensions, the tool holder unit comprising:
   a first upper frame;
   a first lower frame;
   a second upper frame;
   a second lower frame;
   the first lateral extension of the tool located between the first upper frame and the first lower frame;
   the second lateral extension of the tool located between the second upper fame and the second lower frame;
   a drive member for driving the tool to move the tool; and
   an offsetting member located between the first lateral extension of the tool and one of the first upper frame and the first lower frame and between the second lateral extension of the tool and one of the second upper frame and the second lower frame for offsetting gravitational forces acting on the tool.

2. The tool holder unit of claim 1, wherein the drive member is connected to the tool.

3. The tool holder unit of claim 1, wherein the drive member is a pressurized fluid cylinder.

4. The tool holder unit of claim 1, wherein the offsetting member comprises a compression spring.

5. The tool holder unit of claim 1, wherein the offsetting member comprises an elastically deformable member.

6. The tool holder unit of claim 1, wherein the drive member applies a force in the same direction as an application direction of the gravitational forces and the offsetting member provides a force equal to the gravitational forces and in a direction opposite to the application direction of the gravitational forces.

7. A robot comprising:
   a first and second set of bearings;
   a tool holder unit for holding a tool between the first and second set of bearings; the tool having a first and second lateral extensions; the tool holder unit including:
   a first upper frame;
   a first lower frame;
   a second upper frame;
   a second lower frame;
   the first lateral extension of the tool located between the first upper frame and the first lower frame;
   the second lateral extension of the tool located between the second upper frame and the second lower frame;
   a drive member for driving the tool to move the tool; and
   an offsetting member located between the first lateral extension of the tool and one of the first upper frame and the first lower frame and between the second lateral extension of the tool and one of the second upper frame and the second lower frame for offsetting gravitational forces acting on the tool.

8. The tool holder unit of claim 7, wherein the drive member is connected to the tool.

9. The tool holder unit of claim 7, wherein the drive member is a pressurized fluid cylinder.

10. The tool holder unit of claim 7, wherein the offsetting member comprises at least one of a compression spring and an elastically deformable member.

11. The tool holder unit of claim 7, wherein the offsetting member provides a force equal to the gravitational forces and in a direction opposite to an application direction of the gravitational forces.

* * * * *